(12) United States Patent
Wang (10) Patent No.: US 11,477,472 B2
(45) Date of Patent: Oct. 18, 2022

(54) VIDEO DECODING METHOD AND VIDEO DECODING DEVICE

(71) Applicant: ALi Corporation, Hsinchu (TW)

(72) Inventor: Feng Wang, Guangdong (CN)

(73) Assignee: ALi Corporation, Hsinchu (TW)

( * ) Notice: Subject to any disclaimer, the term of this patent is extended or adjusted under 35 U.S.C. 154(b) by 0 days.

(21) Appl. No.: 17/231,014

(22) Filed: Apr. 15, 2021

(65) Prior Publication Data

US 2022/0070481 A1 Mar. 3, 2022

(30) Foreign Application Priority Data

Aug. 27, 2020 (CN) .......................... 202010877675.X (51) Int. Cl.

| H04N 7/12 | (2006.01) |
|---|---|
| H04N 19/44 | (2014.01) |
| H04N 19/13 | (2014.01) |
| H04N 19/172 | (2014.01) |
| H04N 19/169 | (2014.01) |
| H04N 19/436 | (2014.01) |

(52) U.S. Cl.
CPC ............. *H04N 19/44* (2014.11); *H04N 19/13* (2014.11); *H04N 19/172* (2014.11); *H04N 19/1883* (2014.11); *H04N 19/436* (2014.11)

(58) Field of Classification Search
CPC ...... H04N 19/44; H04N 19/13; H04N 19/172; H04N 19/1883; H04N 19/436
USPC ...................................................... 375/240.25
See application file for complete search history.

(56) References Cited

U.S. PATENT DOCUMENTS

| 2016/0301942 | A1* | 10/2016 | Qiu | H04N 19/40 |
|---|---|---|---|---|
| 2017/0019679 | A1* | 1/2017 | Wang | H04N 19/423 |
| 2018/0096495 | A1* | 4/2018 | Jiang | G06T 19/006 |
| 2018/0234690 | A1* | 8/2018 | Fu | H04N 19/174 |
| 2021/0392354 | A1* | 12/2021 | Fujimoto | H04N 19/593 |
| 2022/0116600 | A1* | 4/2022 | Rosewarne | H04N 19/1883 |

FOREIGN PATENT DOCUMENTS

| CN | 105992008 | 10/2016 |
|---|---|---|
| CN | 106412597 | 2/2017 |

* cited by examiner

*Primary Examiner* — Gims S Philippe
(74) *Attorney, Agent, or Firm* — JCIPRNET (57) ABSTRACT

The disclosure provides a video decoding method and a video decoding device. An initial stream is received. In a first flow cycle, entropy decoding is performed on a plurality of first frames in parallel according to the initial stream by a plurality of entropy decoders of a plurality of processing cores, so as to generate a plurality of first decoded streams respectively corresponding to the first frames. In the first flow cycle, a second decoded stream is decoded by a plurality of coding tree unit decoders of the processing cores, so as to reconstruct a second frame.

15 Claims, 9 Drawing Sheets

VIDEO DECODING METHOD AND VIDEO DECODING DEVICE

CROSS-REFERENCE TO RELATED APPLICATION

This application claims the priority benefit of China application serial no. 202010877675.X, filed on Aug. 27, 2020. The entirety of the above-mentioned patent application is hereby incorporated by reference herein and made a part of this specification.

BACKGROUND

Technical Field

The disclosure relates to a video decoding technology, and particularly relates to a video decoding method and a video decoding device.

Description of Related Art

Due to the development and popularization of hardware that can reproduce and store high-definition video, there is an increasing demand for video codecs that can efficiently encode or decode high-definition video. To meet such a demand, the Video Coding Experts Group (VCEG) under the International Telecommunication Union (ITU-T) co-developed the H.265/HEVC (High Efficiency Video Coding) project with the Moving Picture Experts Group (MPEG) under the International Organization for Standardization ISO/IEC. Their goal is to provide a higher coding efficiency in H.265/HEVC standard than that in the H.264/AVC (Advanced Video Coding) video compression standard.

In addition, as the display technology advances, various image playback devices are becoming larger in size, and the requirements for image quality are becoming higher, too. For example, monitors with UHD (ultra-high-definition) resolutions (such as 4K and 8K) become increasingly common. As the size or resolution of the image increases, the video decoders that adopt various video compression standards need to have improved processing performance so as to support a frame rate of 60 frames per second (60 fps) or higher in real time. However, the processing performance of a video decoder implemented by a dedicated hardware circuit is limited by semiconductor manufacturing technology. Therefore, how to improve the quality of the output image supported by the image processing chip under limited semiconductor manufacturing technology is an important issue to those skilled in the art. At present, some people have proposed to improve the decoding performance through parallel processing of a multi-core processing architecture, but it is limited by the stream characteristics. For example, a multi-core processing architecture can improve the decoding performance only when the number of sub-regions (such as slices or tiles) contained in a frame meets certain conditions.

SUMMARY

The disclosure provides a video decoding method and a video decoding device, which improve the decoding performance without being limited by stream characteristics.

An embodiment of the disclosure provides a video decoding method, which includes the following steps. An initial stream is received. The initial stream includes a stream of a plurality of first frames and a stream of a second frame. In a first flow cycle, entropy decoding is performed on the stream of the first frames in parallel according to the initial stream by a plurality of entropy decoders of a plurality of processing cores to generate a plurality of first decoded streams respectively corresponding to the first frames. Meanwhile in the first flow cycle, a second decoded stream is decoded by a plurality of coding tree unit decoders of the processing cores to reconstruct the second frame. The second decoded stream is generated by performing entropy decoding on the stream of the second frame.

From another aspect, an embodiment of the disclosure provides a video decoding device, which includes a memory and a plurality of processing cores. Each of the processing cores includes an entropy decoder and a coding tree unit decoder. The entropy decoders of the processing cores are coupled to the memory. The coding tree unit decoders of the processing cores are coupled to the memory. The memory records an initial stream. The initial stream includes a stream of a plurality of first frames and a stream of a second frame. In a first flow cycle, the entropy decoders perform entropy decoding on the stream of the first frames in parallel according to the initial stream to generate a plurality of first decoded streams respectively corresponding to the first frames. Also in the first flow cycle, the coding tree unit decoders decode a second decoded stream to reconstruct the second frame. The second decoded stream is previously generated by performing entropy decoding on the stream of the second frame.

Based on the above, according to the embodiments of the disclosure, the entropy decoders in multiple processing cores can simultaneously perform entropy decoding on different frames in the same flow cycle. In the same flow cycle, based on the entropy decoding result generated in the previous flow cycle, the coding tree unit decoders in multiple processing cores can simultaneously decode the coding tree units of different rows in the same frame. Accordingly, the decoding efficiency can be improved by the parallel decoding of multiple processing cores without being limited to the stream characteristics, thus having a wider range of applications.

In order to make the above and other features and advantages of the disclosure more comprehensible, specific embodiments are described in detail below with reference to the accompanying drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Hereinafter, the disclosure will be described in detail with reference to the exemplary embodiments, and examples of the exemplary embodiments are illustrated in the accompanying drawings. The same reference numerals are used in the drawings and descriptions to indicate the same or similar parts where appropriate.

It should be understood that although terms such as "first" and "second" may be used hereinafter to refer to various components/data, these components/data are not limited by such terms. Such terms are only used to distinguish one component/data from another component/data.

Figure 1:
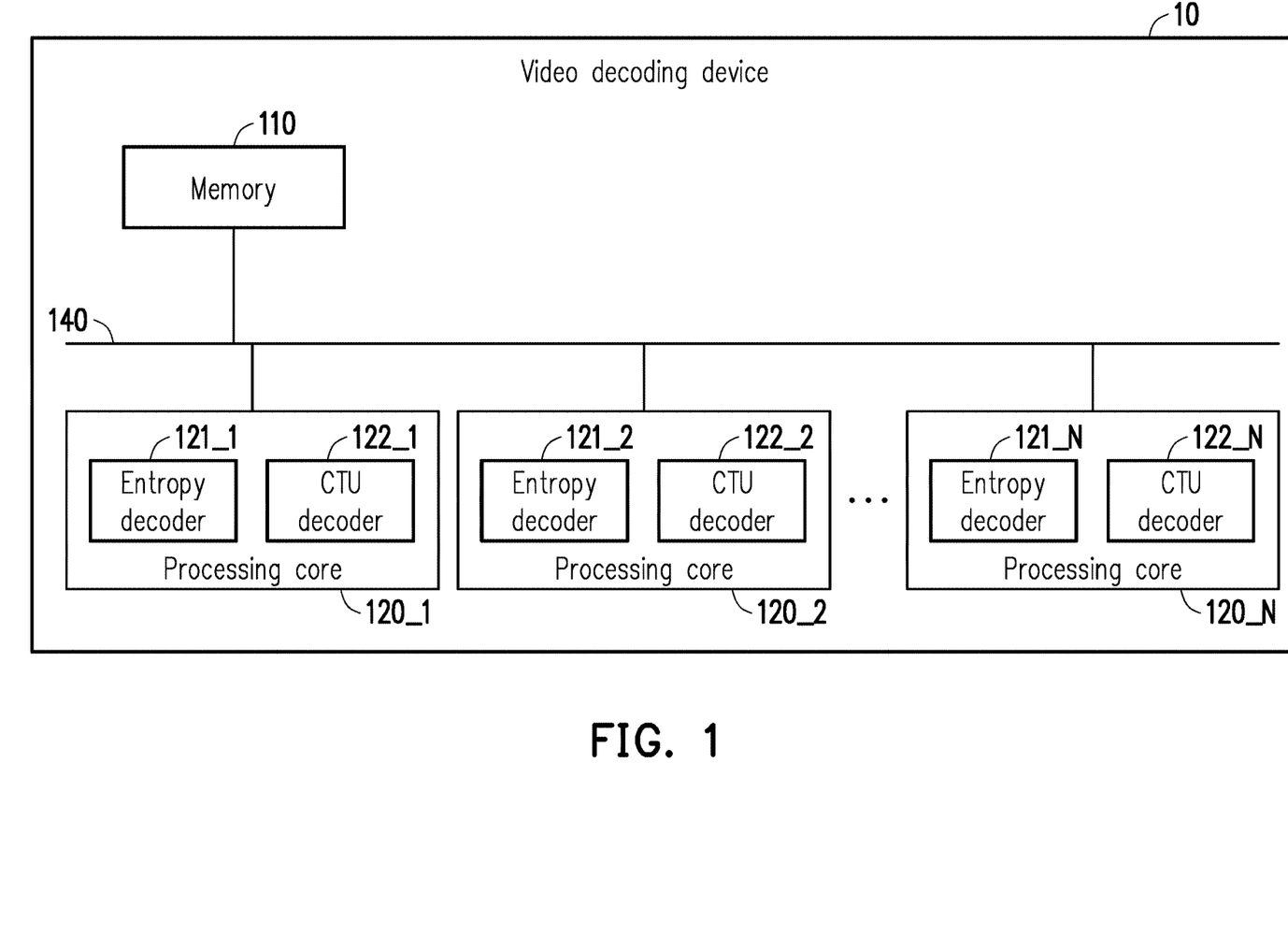
FIG. 1 is a schematic diagram of a video decoding device according to an embodiment of the disclosure.

FIG. 1 is a schematic diagram of a video decoding device according to an embodiment of the disclosure. Referring to FIG. 1, the video decoding device 10 may adopt the HEVC standard, the AVS2 (Audio Video coding Standard Second Generation) standard or other similar video encoding/decoding standards, which is not particularly limited. A video encoding device (not shown) may divide each frame in a video into non-overlapping coding tree units (CTU) for compression coding according to the aforementioned video compression standard. The video decoding device 10 may obtain an initial stream of a plurality of frames encoded according to the aforementioned video compression standard, and decode the initial stream according to the aforementioned video compression standard to reconstruct the frame data in the initial stream, so as to obtain a plurality of reconstructed frames of a video for a display device to play the reconstructed frames to display the video. Here, the video decoding device 10 includes a memory 110 and N processing cores 120_1 to 120_N, wherein N is an integer greater than 1. The memory 110 and the N processing cores 120_1 to 120_N may be implemented by integrated circuits.

The processing cores 120_1 to 120_N are connected to the memory 110 via a bus 140, and are configured to perform an entropy decoding operation and a coding tree unit decoding operation to generate the aforementioned reconstructed frames. Specifically, the processing cores 120_1 to 120_N respectively includes entropy decoders 121_1 to 121_N and coding tree unit decoders 122_1 to 122_N. The entropy decoders 121_1 to 121_N and the coding tree unit decoders 122_1 to 122_N are coupled to the memory 110, and access the memory 110 during the entropy decoding operation and the coding tree unit decoding operation. As shown in FIG. 1, since the video decoding device 10 includes N processing cores 120_1 to 120_N, the video decoding device 10 includes N entropy decoders 121_1 to 121_N and N coding tree unit decoders 122_1 to 122_N. Hereinafter, the coding tree unit is referred to as CTU, and the coding tree unit decoder is referred to as CTU decoder for short.

The entropy decoders 121_1 to 121_N receive the initial stream, and perform entropy decoding on the stream corresponding to each frame in the initial stream to obtain syntax elements and some quantized residual coefficients. In an embodiment, the entropy decoders 121_1 to 121_N may decode the initial stream based on a context adaptive binary arithmetic coding (CABAC) algorithm. For example, the entropy decoders 121_1 to 121_N may each perform operations such as probability update, binary arithmetic decoding, and debinarization according to CABAC algorithm. In an embodiment, the entropy decoders 121_1 to 121_N may record the decoded streams generated by entropy decoding the initial stream to the memory 110, and the CTU decoders 122_1 to 122_N may retrieve the aforementioned decoded streams from the memory 110 to perform CTU decoding including such as dequantization, inverse transformation, intra-frame prediction, inter-frame prediction, and loop filtering, so as to finally generate the reconstructed frame.

Figure 2:
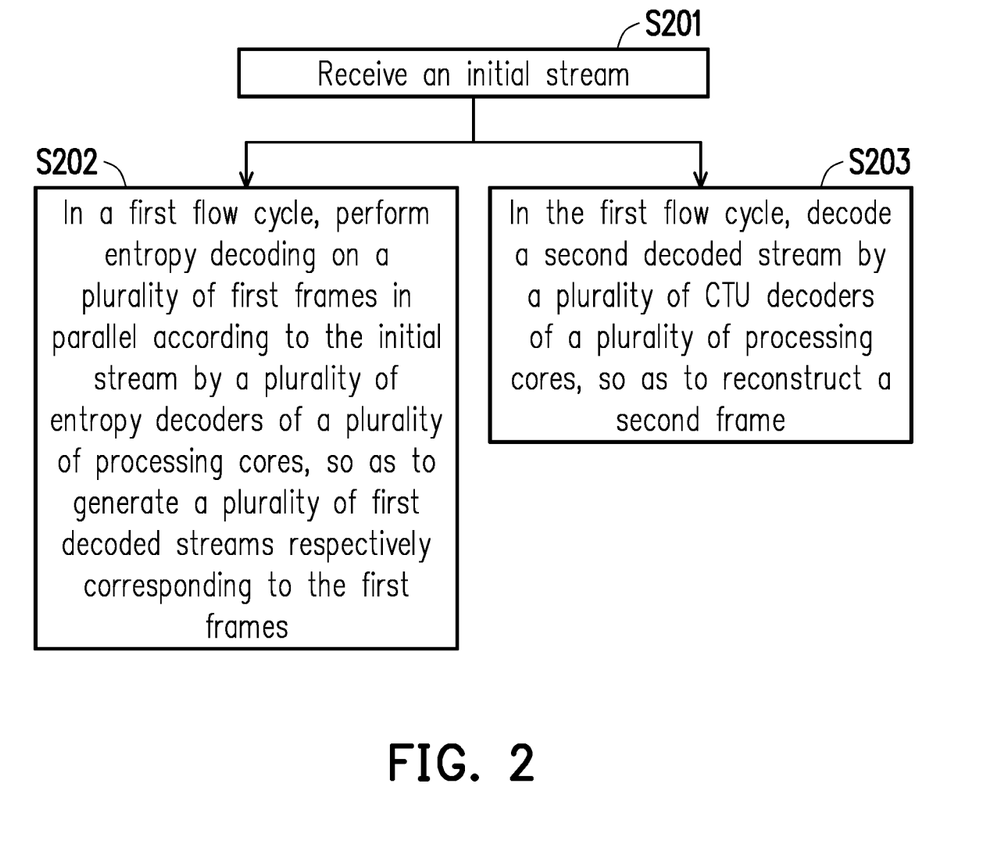
FIG. 2 is a flowchart of a video decoding method according to an embodiment of the disclosure.

FIG. 2 is a flowchart of a video decoding method according to an embodiment of the disclosure. Referring to FIG. 1 and FIG. 2, the method of the present embodiment is applicable to the video decoding device 10 in FIG. 1. The following describes the detailed flow of the method of the present embodiment in conjunction with the components in the video decoding device 10.

In step S201, the video decoding device 10 receives an initial stream, and the initial stream is then recorded into the memory 110. The initial stream is generated by the video encoding device compressing a plurality of frames of a video. The initial stream includes streams of a plurality of first frames and streams of a second frame.

In step S202, in a first flow cycle, the entropy decoders 121_1 to 121_N of the processing cores 120_1 to 120_N perform entropy decoding on the stream of the first frames in parallel, so as to generate a plurality of first decoded streams corresponding to the plurality of the first frames. In an embodiment, the first decoded stream includes a syntax element associated with the first frame and a quantized residual coefficient. Since the initial probability tables used for entropy decoding of the first frames are the same, the entropy decoders 121_1 to 121_N may respectively process one of multiple frames to realize parallel processing. In other words, the entropy decoders 121_1 to 121_N may entropy decode N frames in parallel, and each entropy decoder independently entropy decodes one frame. Furthermore, in step S203, in the first flow cycle, the CTU decoders 122_1 to 122_N of the processing cores 120_1 to 120_N decode a second decoded stream to reconstruct the second frame. The second decoded stream is generated by entropy decoding the stream of the second frame. Specifically, in an embodiment, the second decoded stream is resulted from the entropy decoders 121_1 to 121_N performing entropy decoding, which includes a syntax element associated with the second frame and a quantized residual coefficient. It should be noted that step S202 and step S203 are performed in the same time period. In other words, in the same flow cycle, the entropy decoders 121_1 to 121_N respectively perform entropy decoding on multiple first frames, and at the same time, the CTU decoders 122_1 to 122_N are reconstructing the second frame. These first frames are different from each other, and the second frame is also different from the first frames.

In one flow cycle, each of the entropy decoders 121_1 to 121_N completes the processing of probability table reading, probability updating, binary arithmetic decoding, and debinarization for at least a part of the stream in one frame according to the decoding performance thereof. For example, if the resolution of one frame is 4 times capability of one entropy decoder could decode in one flow cycle, then one single entropy decoder can complete entropy decoding of ¼ frame in one flow cycle. Similarly, in one flow cycle, the CTU decoders 122_1 to 122_N jointly perform the processing of dequantization, inverse transformation, intra-frame prediction, inter-frame prediction, and loop filtering on each row of CTUs in one frame according to the decoding performance thereof. For example, if the resolution of one frame is 4 times the capability of one CTU decoder could decode in one flow cycle, then four CTU decoders are required to jointly perform the decoding work in one flow cycle so as to complete the reconstruction of one frame.

Figure 3:
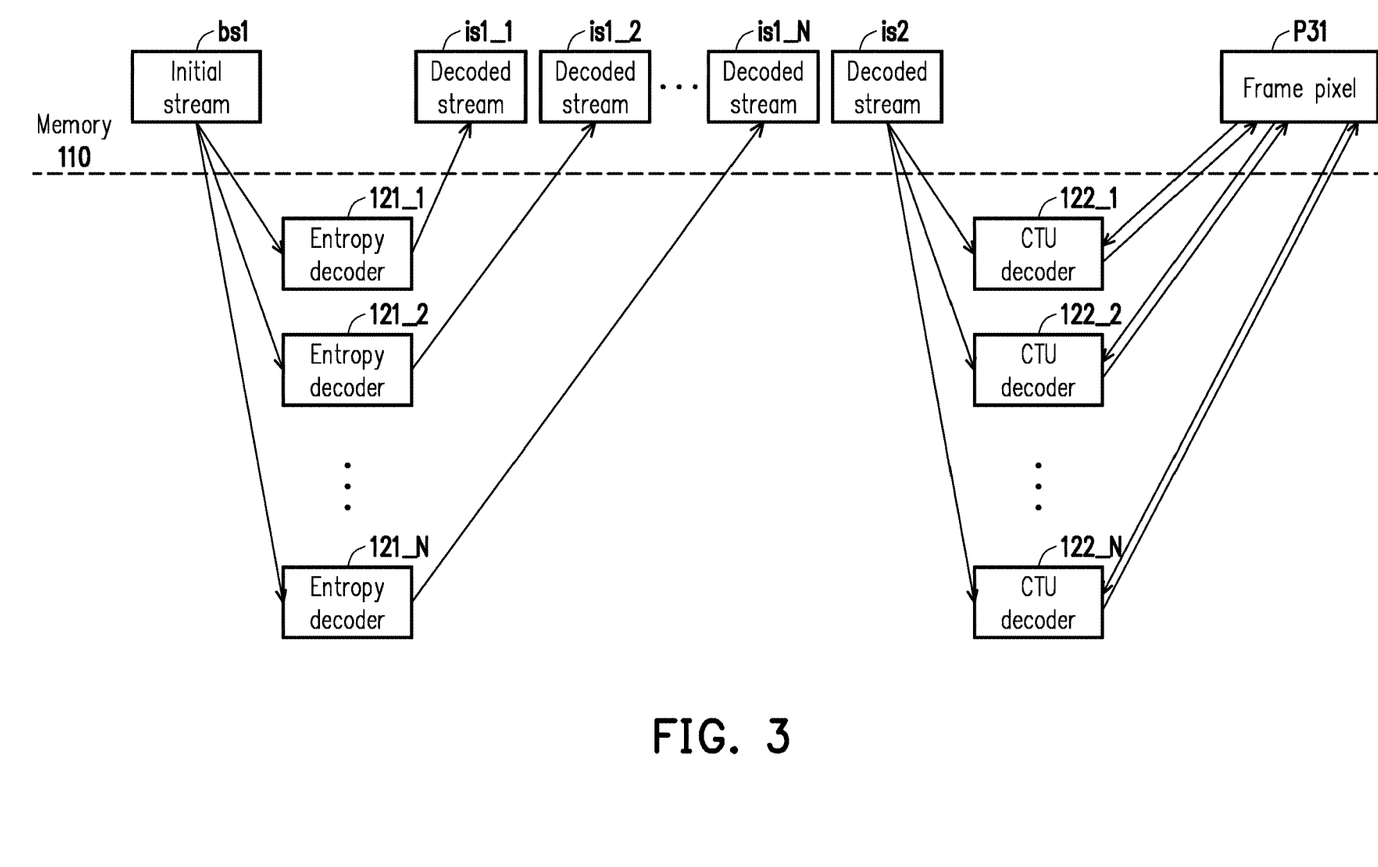
FIG. 3 is a schematic diagram of an operation of the video decoding method according to an embodiment of the disclosure.

In detail, FIG. 3 is a schematic diagram of the decoding operations in the same flow cycle according to an embodiment of the disclosure. Referring to FIG. 3, in the first flow cycle, the plurality of entropy decoders 121_1 to 121_N may read different part of the initial stream bs1 in the memory 110, and simultaneously but independently perform entropy decoding to the read streams to generate a plurality of first decoded streams is1_1 to is1_N corresponding to a plurality of first frames. The decoded streams is1_1 to is1_N correspond to different first frames one-to-one. The entropy decoders 121_1 to 121_N may write the decoded streams is1_1 to is1_N to the memory 110. At the same time, according to the decoded stream is2 generated by one of the entropy decoders 121_1 to 121_N in the second flow cycle, the CTU decoders 122_1 to 122_N may perform CTU decoding in parallel in the first flow cycle to reconstruct the frame pixels P31 of the second frame. It should be noted that the second flow cycle is earlier than the first flow cycle. In other words, in the second flow cycle that is earlier than the first flow cycle, the entropy decoders 121_1 to 121_N also perform entropy decoding of multiple frames according to the initial stream bs1, and one of the multiple frames is the second frame, so as to generate the second decoded stream is2 corresponding to the second frame before the first flow cycle.

Thus, the decoding efficiency of the video decoding device 10 is greatly improved by the processing cores 120_1 to 120_N working in parallel. For example, assumed that each of the processing cores 120_1 to 120_N could process 60 4K-resolution frames per second (4K@p60), then the performance of the processing cores 120_1 to 120_N working in parallel could achieve 60 8K-resolution frames per second (8K@p60) or even higher frame rates and higher image resolutions.

Figure 4:
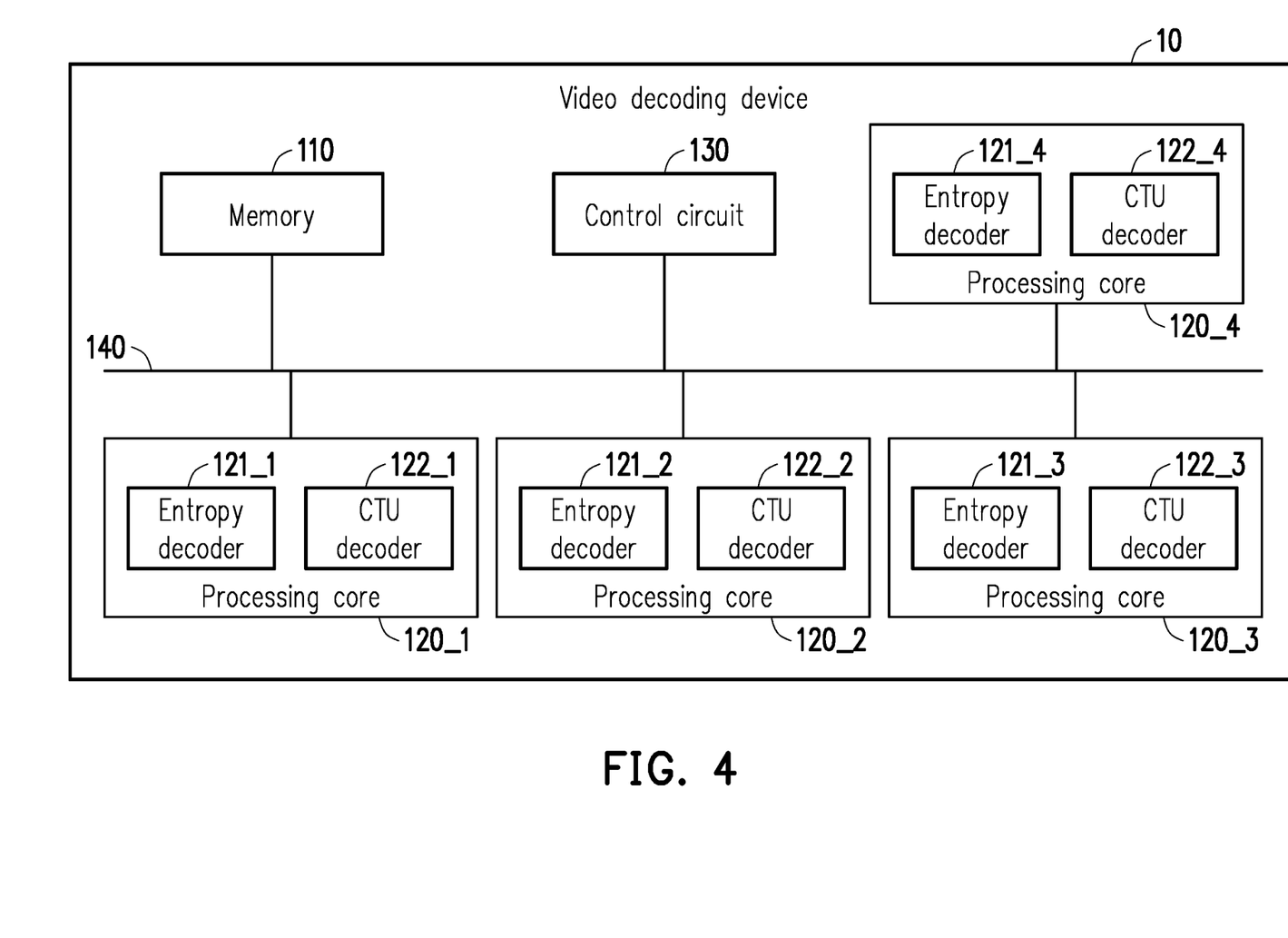
FIG. 4 is a schematic diagram of a video decoding device with four processing cores according to an embodiment of the disclosure.

In order to explain in detail, four processing cores 120_1 to 120_4 are taken as an example (N=4) to illustrate the parallel decoding of multiple processing cores. FIG. 4 is a schematic diagram of a video decoding device with four processing cores according to an embodiment of the disclosure. Referring to FIG. 4, the video decoding device 10 may include a memory 110, four processing cores 120_1 to 120_4, and a control circuit 130. Each of the processing cores 120_1 to 120_4 includes one of a plurality of entropy decoders 121_1 to 121_4 and one of a plurality of CTU decoders 122_1 to 122_4. The coupling relationship and function of each component are the same as or similar to the embodiment shown in FIG. 1, and will not be repeated here.

It should be noted that in the present embodiment, the control circuit 130 is coupled to the entropy decoders 121_1 to 121_4 and the CTU decoders 122_1 to 122_4 of the processing cores 120_1 to 120_4. The control circuit 130 may be configured to control whether to activate the processing cores 120_1 to 120_4 and to control the timings of activating the entropy decoders 121_1 to 121_4 and the CTU decoders 122_1 to 122_4 for parallel decoding process. For example, in an embodiment, the control circuit 130 may include a power management unit, which activates the processing cores 120_1 to 120_4 by controlling the power states of the processing cores 120_1 to 120_4. In an embodiment, the control circuit 130 may determine the number of the processing cores 120_1 to 120_4 activated according to the video format of the initial stream. For example, the control circuit 130 may determine to activate all or some of the processing cores 120_1 to 120_4 according to the image resolution in the video format. The video format is, for example, written to a register by a central processing unit (not shown) of the video decoding device for the control circuit 130 to read.

For example, suppose that the processing performance of each of the processing cores 120_1 to 120_4 is 4K@p60. To meet the requirement of 8K@p60, the control circuit 130 may determine to activate all four processing cores 120_1 to 120_4 for parallel decoding. To meet the requirement of 4K@p120 (120 4K-resolution frame per second), the control circuit 130 may determine to activate two of the processing cores 120_1 to 120_4 for parallel decoding. To meet the requirement of 4K@p60, the control circuit 130 may determine to activate only one of the processing cores 120_1 to 120_4 to decode independently. Based on the above, the same hardware configuration can be used to achieve different processing performances.

In an embodiment, when the entropy decoders 121_1 to 121_4 are all activated, each of the entropy decoders 121_1 to 121_4 performs entropy decoding on a frame basis, and writes the entropy decoding result of each frame to a dedicated buffer area of the memory 110 according to a dedicated storage address. In an embodiment, the entropy decoders 121_1 to 121_4 may include a first entropy decoder and a second entropy decoder. In other words, the first entropy decoder and the second entropy decoder are two of the entropy decoders 121_1 to 121_4. The control circuit 130 may respectively configure a first buffer area and a second buffer area for the first entropy decoder and the second entropy decoder. The first entropy decoder writes one of the first decoded streams to the first buffer area of the memory 110, and the second entropy decoder writes another one of the first decoded streams to the second buffer area of the memory 110. In addition, the entropy decoders 121_1 to 121_4 may include a third entropy decoder and a fourth entropy decoder. In other words, the third entropy decoder and the fourth entropy decoder are the other two of the entropy decoders 121_1 to 121_4. The control circuit 130 may respectively configure a third buffer area and a fourth buffer area for the third entropy decoder and the fourth entropy decoder. The third entropy decoder writes another one of the first decoded streams to the third buffer area of the memory 110, and the fourth entropy decoder writes yet another one of the first decoded streams to the fourth buffer area of the memory 110.

Figure 5:
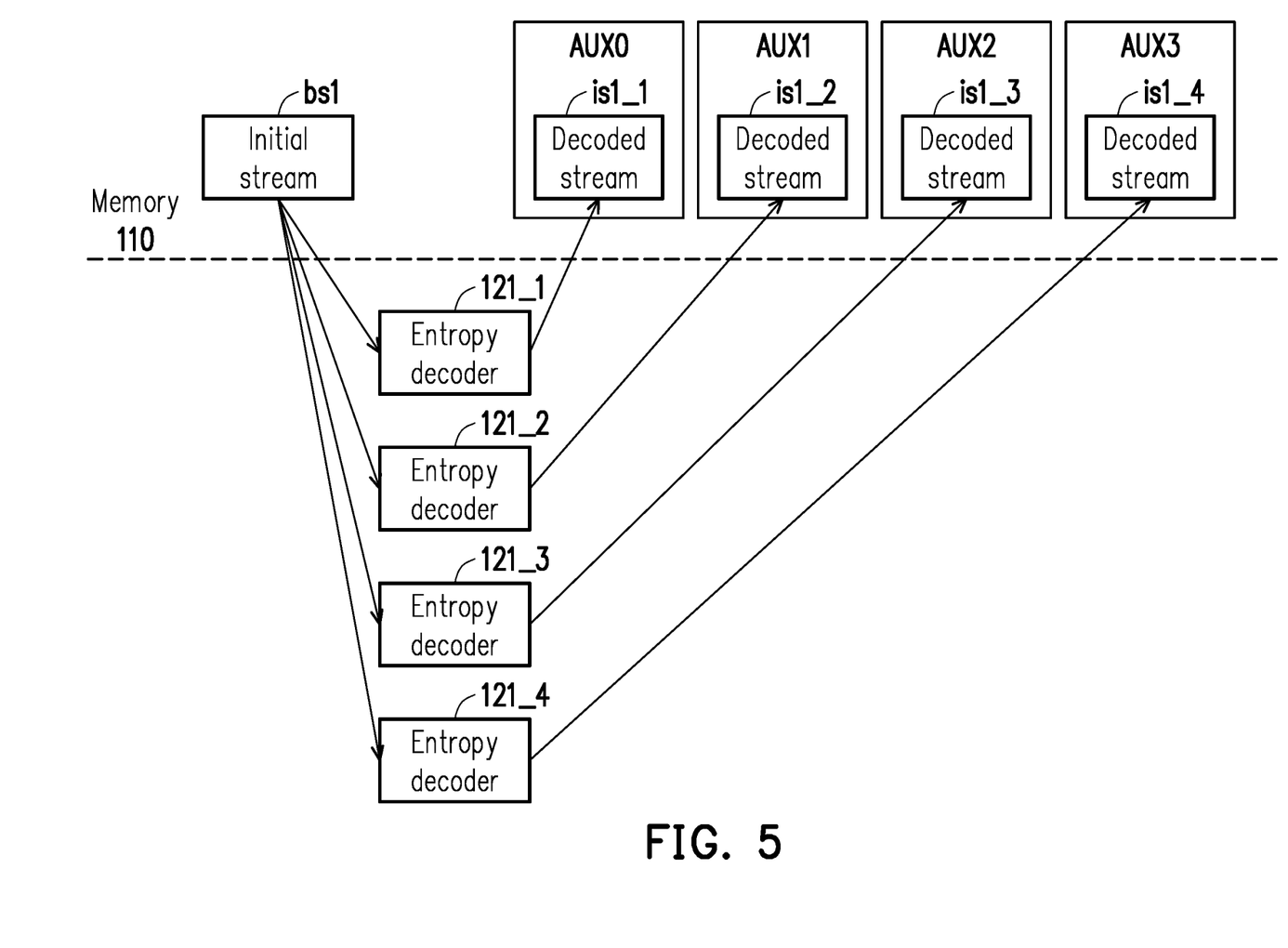
FIG. 5 is a schematic diagram of entropy decoding performed by an entropy decoder according to an embodiment of the disclosure.

In order to explain in detail, the following is based on an example where the control circuit 130 activates the four processing cores 120_1 to 120_4 for parallel decoding. FIG. 5 is a schematic diagram of entropy decoding performed by the entropy decoders according to an embodiment of the disclosure. Referring to FIG. 5, the control circuit 130 may configure buffer areas AUX0 to AUX3 for the entropy decoders 121_1 to 121_4 after determining to activate the four processing cores 120_1 to 120_4. In other words, the memory 110 includes the buffer areas AUX0 to AUX3 respectively dedicated to the entropy decoders 121_1 to 121_4, and the buffer areas AUX0 to AUX3 are configured to record the decoded streams is1_1 to is1_4 (that is, four first decoded streams) generated by the entropy decoders 121_1 to 121_4. Specifically, the entropy decoder 121_1 writes the decoded stream is1_1 to the buffer area AUX0 of the memory 110 when performing entropy decoding on one frame. The entropy decoder 121_2 writes the decoded stream is1_2 to the buffer area AUX1 of the memory 110 when performing entropy decoding on another frame. Accordingly, the entropy decoders 121_1 to 121_4 respectively write the decoded streams is1_1 to is1_4 corresponding to different frames to the buffer areas AUX0 to AUX3 of the memory 110.

In an embodiment, each of the CTU decoders 122_1 to 122_4 performs CTU decoding on a CTU-row basis, and writes the decoding result (that is, the frame pixels of the reconstructed frame) to one storage block associated with the reconstructed frame in the memory 110. It should be noted that when decoding a CTU, the CTU decoders 122_1 to 122_4 need boundary reference information of the CTU to generate the reconstructed pixels for the reconstructed frame. Said boundary reference information includes at least part of the reconstructed pixel information decoded from the CTUs of the previous row adjacent to the CTU row to be decoded. Therefore, since video compression standards suggest a raster scanning order in processing video data, the CTU decoders 122_1 to 122_4 are configured to activate sequentially, so that the CTU decoders 122_1 to 122_4 may obtain correct and sufficient boundary reference information to perform CTU decoding.

In an embodiment, the CTU decoders 122_1 to 122_4 include a first CTU decoder and a second CTU decoder. In other words, the first CTU decoder and the second CTU decoder are two of the CTU decoders 122_1 to 122_4. In addition, the CTU decoders 122_1 to 122_4 further include a third CTU decoder and a fourth CTU decoder. The first CTU decoder is used to decode the CTUs of the $i^{th}$ row of the second frame in the first flow cycle, and the second CTU decoder is used to decode the CTUs of the $(i+1)^{th}$ row of the second frame in the first flow cycle, wherein i is greater than 0 and less than the height of the image resolution. That is, the CTU decoders 122_1 to 122_4 are respectively responsible for processing the CTUs of different rows. In an embodiment, in response to the first CTU decoder completing the decoding of the first X CTUs of the $i^{th}$ row, the control circuit 130 may activate the second CTU decoder to start decoding the CTUs of the $(i+1)^{th}$ row. That is, the CTU decoders 122_1 to 122_4 need to be activated sequentially, so that each of the CTU decoders 122_1 to 122_4 obtains sufficient boundary reference information for CTU decoding. In an embodiment, the CTU decoders 122_1 to 122_4 may write the boundary reference information to the boundary reference information buffer area of the memory 110.

In detail, in an embodiment, when complete decoding the CTUs of the $i^{th}$ row of the second frame, the boundary reference information generated by decoding the CTUs of the $i^{th}$ row is written to the boundary reference information buffer area of the memory 110 by the first CTU decoder. Then, the second CTU decoder is used to read the boundary reference information from the boundary reference information buffer area, and decode the CTUs of the $(i+1)^{th}$ row in combination with the boundary reference information. When complete decoding the CTUs of the $(i+1)^{th}$ row of the second frame, the second CTU decoder writes the boundary reference information generated by decoding the CTUs of the $(i+1)^{th}$ row to the boundary reference information buffer area of the memory 110.

According to the video encoding/decoding standard, in the conventional multi-core parallel decoding architecture, decoders usually decode data on a CTU-tile or a CTU-slice basis. If the number of tiles or slices divided from the entire frame is less than the number of CTU decoders, or is not an integer multiple of the number of CTU decoders, idle decoders or uneven task allocation may occur during the decoding process, which reduces the decoding efficiency. In addition, regardless of whether the CTU decoder can independently perform CTU decoding for a specific tile or slice, the CTU decoding operation for a CTU row always needs to wait for activation until its previous CTU row finishing decoding. On the contrary, in the embodiments of the disclosure, no matter which tile or slice a CTU belongs to, the boundary reference information generated after decoding each CTU is then written to the boundary reference information buffer area of the memory 110, so the CTU decoding operation for a CTU row does not need to wait for activating till finishing decoding its previous CTU row. In other words, once the first few CTUs of a certain CTU row have been decoded, the boundary reference information buffer area has recorded sufficient boundary reference information for CTU decoding of the next CTU row. Therefore, according to the disclosure, it is not required to wait until the entire row is decoded to activate the next CTU decoder to start CTU decoding, and the disclosure is not subject to the condition that CTUs of the same CTU row may belong to different tiles or slices. Therefore, according to the embodiment of the disclosure, the decoding efficiency is improved and is not limited to the number of tiles or slices.

Figure 6:
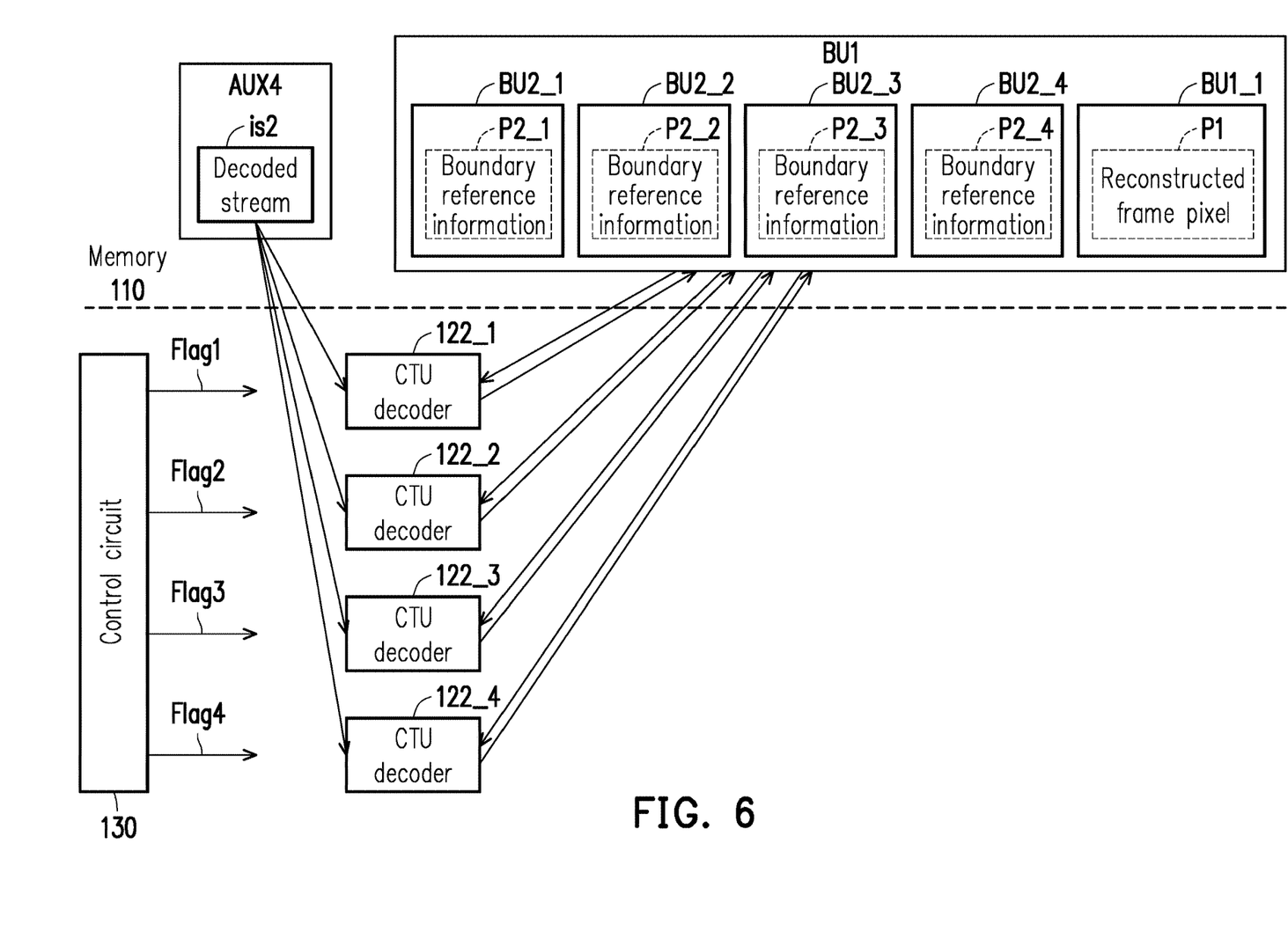
FIG. 6 is a schematic diagram of a coding tree unit decoder decoding a frame according to an embodiment of the disclosure.

In order to explain in detail, the following is also based on an example where the control circuit 130 activates four processing cores 120_1 to 120_4 for parallel decoding. FIG. 6 is a schematic diagram of a CTU decoder decoding a frame according to an embodiment of the disclosure. Referring to FIG. 6, the CTU decoders 122_1 to 122_4 may retrieve a decoded stream is2 associated with a frame from a buffer area AUX4 for CTU decoding, and the CTU decoders 122_1 to 122_4 respectively decode CTUs of different rows. Specifically, when the CTU decoder 122_1 is responsible for decoding the CTUs of the $i^{th}$ row, the CTU decoder 122_2 is responsible for decoding the CTUs of the $(i+1)^{th}$ row; the CTU decoder 122_3 is responsible for decoding the CTUs of the $(i+2)^{th}$ row; and the CTU decoder 122_4 is responsible for decoding the CTUs of the $(i+3)^{th}$ row. Then, when the CTU decoder 122_1 is responsible for decoding the CTUs of the $(i+4)^{th}$ row, the CTU decoder 122_2 is responsible for decoding the CTUs of the $(i+5)^{th}$ row; the CTU decoder 122_3 is responsible for decoding the CTUs of the $(i+6)^{th}$ row; and the CTU decoder 122_4 is responsible for decoding the CTUs of the $(i+7)^{th}$ row. Accordingly, each of the CTU decoders 122_1 to 122_4 decodes multiple rows of CTUs of the same frame. The CTU decoders 122_1 to 122_4 write the reconstructed frame pixels P1 generated by CTU decoding to a reconstructed frame buffer area Bu1_1 of the memory 110. In addition, since the CTU decoders 122_1 to 122_4 need the decoding result of the CTUs of the previous row (i.e. boundary reference information) to perform CTU decoding, the control circuit 130 may set timing flags Flag1 to Flag4 to control the CTU decoders 122_1 to 122_4 to sequentially start CTU decoding in a flow cycle.

It should be noted that the buffer area Bu1 in the memory 110 is configured to record the reconstructed frame pixels P1 and the boundary reference information P2_1 to P2_4 output by the CTU decoders 122_1 to 122_4. In an embodiment, the buffer area Bu1 is configured to include a reconstructed frame buffer area Bu1_1 and boundary reference information buffer areas Bu2_1 to Bu2_4, which are respectively buffer blocks corresponding to different memory addresses. The reconstructed frame buffer area Bu1_1 is used to record the reconstructed frame pixels P1 output by the CTU decoders 122_1 to 122_4, and the boundary reference information buffer areas Bu2_1 to Bu2_4 respectively record the boundary reference information P2_1 to P2_4 output by the CTU decoders 122_1 to 122_4. For example, the boundary reference information P2_1 output by the CTU decoder 122_1 is recorded in the boundary reference information buffer area Bu2_1, and the CTU decoder 122_2 may obtain appropriate boundary reference information from the boundary reference information buffer area Bu2_1 to perform CTU decoding.

For example, when the CTU decoder 122_2 decodes the CTUs of the $(i+1)^{th}$ row of the frame in the first flow cycle, the CTU decoder 122_2 reads the boundary reference information P2_1 generated by the CTU decoder 122_1 from the boundary reference information buffer area Bu2_1 in the memory 110. The boundary reference information P2_1 required by the CTU decoder 122_2 to decode the CTUs of the $(i+1)^{th}$ row of the frame is generated by the CTU decoder 122_1 performing CTU decoding on the CTUs of the $i^{th}$ row. The CTU decoder 122_2 decodes the CTUs of the $(i+1)^{th}$ row according to the boundary reference information P2_1 and the decoded stream corresponding to the CTUs of the $(i+1)^{th}$ row. Based on the same principle, when decoding the CTUs of the $(i+1)^{th}$ row of the frame, the CTU decoder 122_2 writes the boundary reference information P2_2 generated by decoding the CTUs of the $(i+1)^{th}$ row to the boundary reference information buffer area Bu2_2 of the memory 110. The boundary reference information P2_2 generated by the CTU decoder 122_2 through decoding the CTUs of the $(i+1)^{th}$ row can be used by the CTU decoder 122_3 to decode the CTUs of the $(i+2)^{th}$ row.

Figure 7:
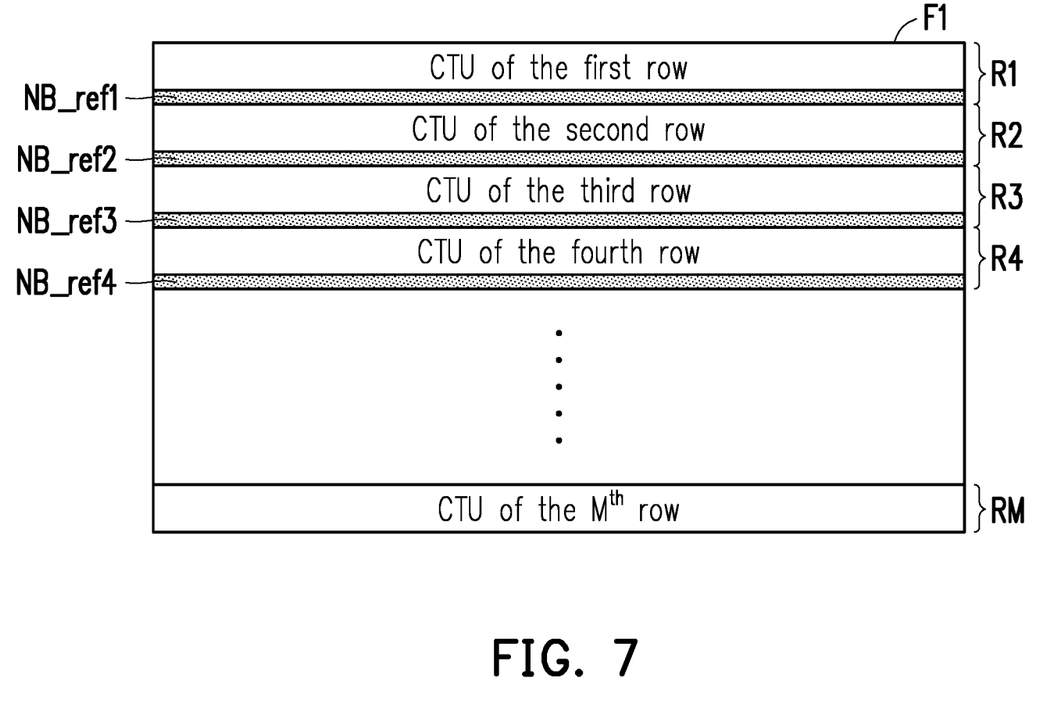
FIG. 7 is a schematic diagram of multiple rows of coding tree units in a frame according to an embodiment of the disclosure.

FIG. 7 is a schematic diagram of multiple rows of CTUs in a frame according to an embodiment of the disclosure. Referring to FIG. 7, the CTU decoders 122_1 to 122_4 may jointly decode all CTUs of the same frame F1. The size of one CTU may be 64×64 pixels, but the disclosure is not limited thereto. The frame F1 may be divided into CTUs arranged in multiple rows. That is, the frame F1 may include CTUs of the first row R1, CTUs of the second row R2, CTUs of the third row R3 . . . , and CTUs of the $M^{th}$ row RM.

As shown in FIG. 7, when the CTU decoder 122_1 decodes the CTUs of the first row R1 of the frame F1, the CTU decoder 122_1 writes the boundary reference information NB_ref1 generated by decoding the CTUs of the first row R1 to the memory 110. When the CTU decoder 122_2 decodes the CTUs of the second row R2 of the frame F1, the CTU decoder 122_2 reads the boundary reference information NB_ref1 in the memory 110 to integrate the data of CTU R2 and the boundary reference information NB_ref1 for decoding. The CTU decoder 122_2 writes the boundary reference information NB_ref2 generated after decoding the CTUs of the second row R2 to the memory 110. Similarly, when the CTU decoder 122_3 decodes the CTUs of the third row R3 of the frame F1, the CTU decoder 122_3 also reads and uses the boundary reference information NB_ref2 to decode the CTUs of the third row R3. The CTU decoder 122_3 writes the boundary reference information NB_ref3 generated after decoding the CTUs of the third row R3 to the memory 110. When the CTU decoder 122_4 decodes the CTUs of the fourth row R4 of the frame F1, the CTU decoder 122_4 reads and uses the boundary reference information NB_ref3 to decode the CTUs of the fourth row R4. The CTU decoder 122_4 writes the boundary reference information NB_ref4 generated after decoding the CTUs of the fourth row R4 to the memory 110 for reference when the CTU decoder 122_1 decodes the CTUs of the fifth row, and so on. In an embodiment, the boundary reference information stored after the CTU decoding of each row may include four rows of reconstructed pixels.

Figure 8:
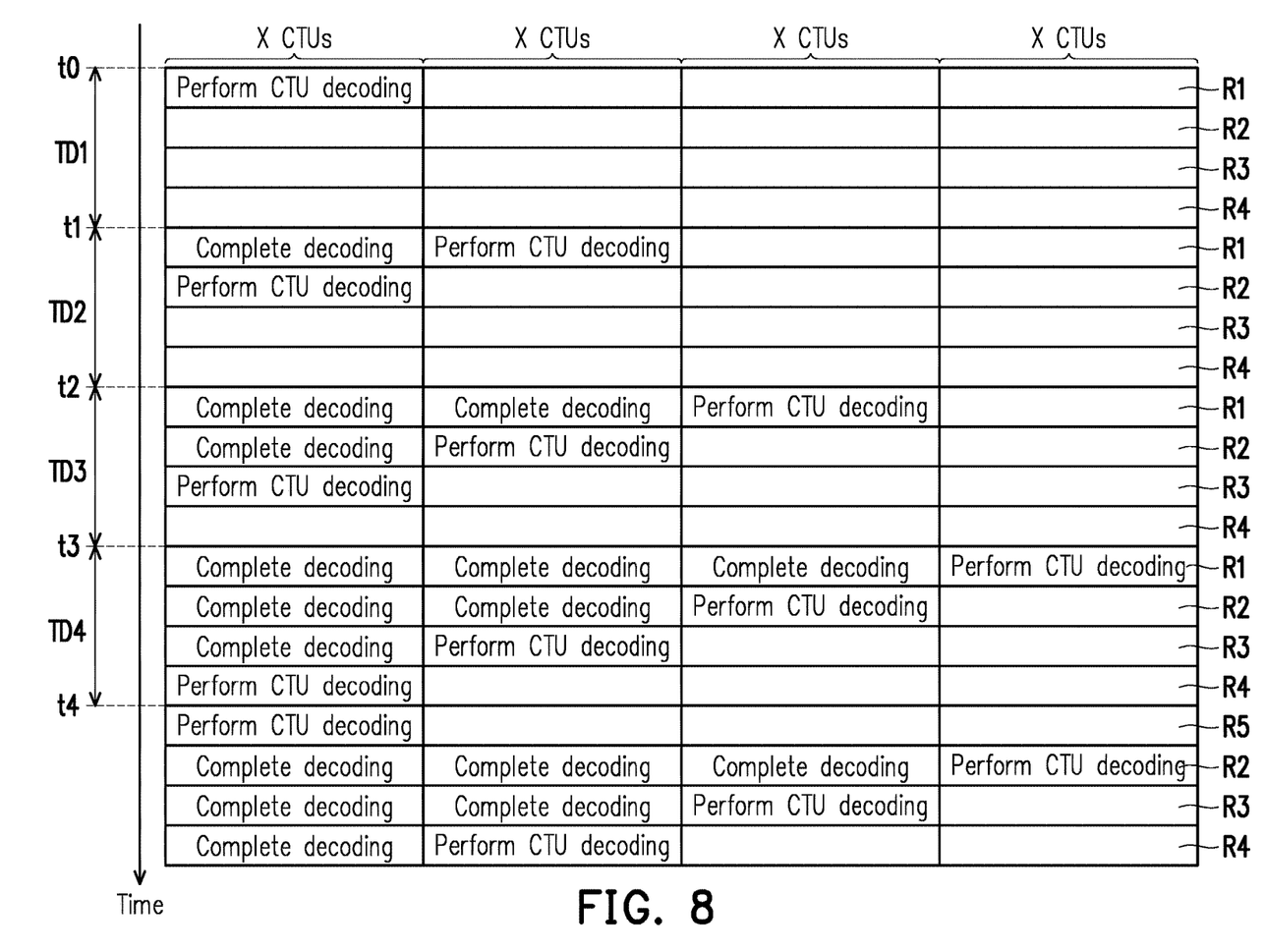
FIG. 8 is a schematic diagram of sequentially activating coding tree unit decoders according to an embodiment of the disclosure.

FIG. 8 is a schematic diagram of sequentially activating the CTU decoders according to an embodiment of the disclosure. Referring to FIG. 8, in the present embodiment, the control circuit 130 activates the CTU decoder 122_1 to start decoding the CTUs of the first row R1 of the frame F1 at the time t0, and completes the CTU decoding of X CTUs at the time t1. In response to the CTU decoder 122_1 completing the decoding of X CTUs, the control circuit 130 activates the CTU decoder 122_2 to start decoding the CTUs of the second row R2 of the frame F1.

At the time t2, the CTU decoder 122_2 completes the CTU decoding of X CTUs on the second row R2. In response to the completion of the decoding of X CTUs on the second row R2, the control circuit 130 activates the CTU decoder 122_3 to start decoding the CTUs of the third row R3 of the frame F1. In other words, during the period TD2 between the time t1 and the time t2, the CTU decoder 122_2 performs CTU decoding from the first CTU to the $X^{th}$ CTU on the second row R2; and at the same time, the CTU decoder 122_1 continues to decode the $(X+1)^{th}$ and the subsequent CTUs on the first row R1 to, as shown in FIG. 8 for example, the $2X^{th}$ CTU.

At the time t3, the CTU decoder 122_3 completes the CTU decoding of X CTUs on the third row R3. In response to the completion of the decoding of X CTUs on the third row R3, the control circuit 130 activates the CTU decoder 122_4 to start decoding the CTUs of the fourth row R4 of the frame F1. In other words, during the period TD3 between the time t2 and the time t3, the CTU decoder 122_3 performs CTU decoding from the first CTU to the $X^{th}$ CTU on the third row R3; at the same time, the CTU decoder 122_1 continues to decode the $(2X+1)^{th}$ and the subsequent CTUs on the first row R1 and, as shown in FIG. 8 for example, completes the decoding to the $3X^{th}$ CTU; and at the same time, the CTU decoder 122_2 performs decoding of the $(X+1)^{th}$ and the subsequent CTUs on the second row R2 and, as shown in FIG. 8, completes the decoding to the $2X^{th}$ CTU.

At the time t4, the CTU decoder 122_4 completes the CTU decoding of X CTUs on the fourth row R4. In response to the completion of the decoding of X CTUs on the fourth row R4, if the CTUs of the entire first row R1 have been completed, the control circuit 130 activates the CTU decoder 122_1 to start decoding the CTUs of the fifth row R5 of the frame F1. In other words, during the period TD4 between the time t3 and the time t4, the CTU decoder 122_4 performs CTU decoding from the first CTU to the $X^{th}$ CTU on the fourth row R4; and at the same time, the CTU decoder 122_1 continues to decode the $(3X+1)^{th}$ and the subsequent CTUs on the first row R1, the CTU decoder 122_2 continues to decode the $(2X+1)^{th}$ and the subsequent CTUs on the second row R2, and the CTU decoder 122_3 decodes the $(X+1)^{th}$ and the subsequent CTUs on the third row R3. Accordingly, CTU decoding is repeatedly executed in the above-mentioned time periods TD1 to TD4 till the CTU decoders 122_1 to 122_4 complete the CTU decoding of the frame F1.

It should be noted that the parameter X may be set according to actual applications, and the disclosure is not limited thereto. For example, if the image resolution of the frame is 8K (the width and height are 7680 pixels×4320 pixels) and the size of the CTU is 64×64, one CTU row may include 120 CTUs. Under this condition, X in the example of FIG. 8 may be equal to 30, for example. Under the premise that X is at least 2, the number of X for the control circuit 130 to determine whether to start the CTU decoding of the next row may be more or less than 30 shown in FIG. 8.

Figure 9:
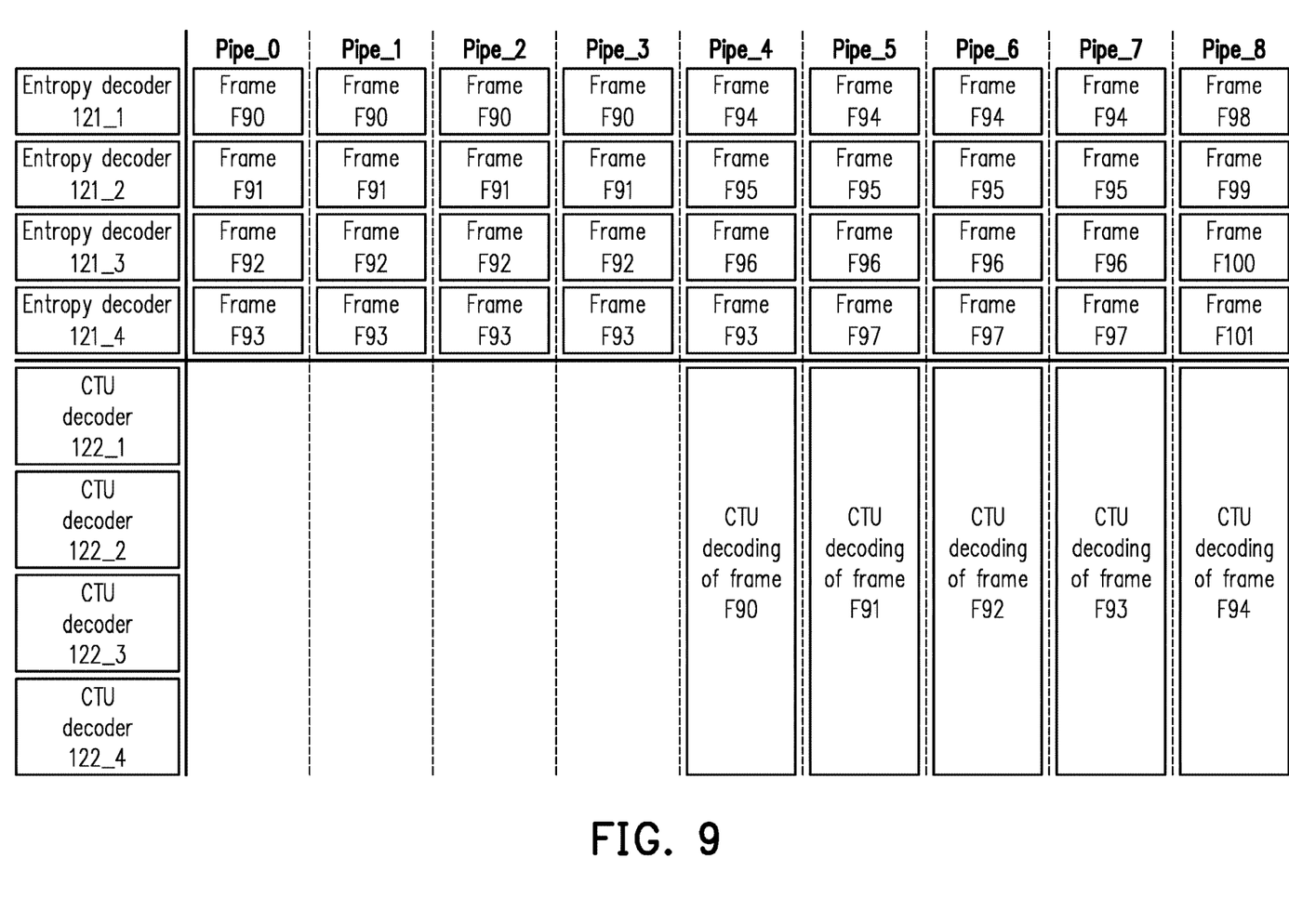
FIG. 9 is a schematic diagram of parallel decoding of multiple processing cores according to an embodiment of the disclosure.

FIG. 9 is a schematic diagram of parallel decoding with multiple processing cores according to an embodiment of the disclosure. Referring to FIG. 9, in the flow cycles Pipe_0 to Pipe_3, the entropy decoders 121_1 to 121_4 respectively perform entropy decoding on the streams corresponding to the frames F90 to F93 in the initial stream. In an embodiment, each of the entropy decoders 121_1 to 121_4 needs four flow cycles to complete the entropy decoding of one frame. Next, in the flow cycles Pipe_4 to Pipe_7, the entropy decoders 121_1 to 121_4 respectively perform entropy decoding on the streams of the frames F94 to F97. Further, in the flow cycle Pipe_4, the CTU decoders 122_1 to 122_4 may perform CTU decoding according to the decoded stream generated by the entropy decoder 121_1 to reconstruct the frame F90. In the flow cycle Pipe_5, the CTU decoders 122_1 to 122_4 may perform CTU decoding according to the decoded stream generated by the entropy decoder 121_2 to reconstruct the frame F91. Accordingly, the CTU decoders 122_1 to 122_4 may reconstruct the frames F92 and F93 in the flow cycles Pipe_6 and Pipe_7. In each of the flow cycles Pipe_4 to Pipe_7, the CTU decoders 122_1 to 122_4 may be activated in the order as shown in the example of FIG. 8. After the flow cycles Pipe_4 to Pipe_7, the CTU decoders 122_1 to 122_4 complete the reconstruction of four frames F90 to F93, and the entropy decoders 121_1 to 121_4 complete the entropy decoding corresponding to the frames F94 to F97. Based on the same principle, the entropy decoders 121_1 to 121_4 and the CTU decoders 122_1 to 122_4 may continue to perform entropy decoding and CTU decoding at the same time. Specifically, in the flow cycle Pipe_8, the entropy decoders 121_1 to 121_4 respectively start to perform entropy decoding on the frames F98 to F101, and the CTU decoders 122_1 to 122_4 perform CTU decoding according to the decoded stream generated by the entropy decoder 121_1 to reconstruct the frame F94.

It should be noted that although the above description is based on four processing cores as an example, those skilled in the art should be able to easily realize the operation for other numbers of processing cores by referring to FIG. 4 to FIG. 9 and the above-mentioned examples. Therefore, details thereof will not be repeated here.

In brief, if the processing performance of one single processing core is 4K@p60, and the parallel decoding of four processing cores can achieve the decoding performance of 8K@p60, the parallel decoding operation of each processing core may be as shown in the example of FIG. 9. Similarly, if the processing performance of one single processing core is 4K@p60, and the decoding performance of 8K@p120 is desired, according to the method disclosed in the above embodiment, eight processing cores may be activated for parallel processing, so that eight entropy decoders can complete entropy decoding of eight frames in parallel in four flow cycles, and eight CTU decoders can complete CTU decoding of two frames in parallel in one flow cycle (that is, eight CTU decoders can work in parallel to complete CTU decoding of eight frames in four flow cycles).

In summary, according to the embodiments of the disclosure, the decoding performance of the video decoding device is greatly improved by the parallel decoding of multiple processing cores. In addition, by controlling the decoding order of the entropy decoders and the CTU decoders, and configuring the entropy decoders and the CTU decoders to process different frames, the decoding efficiency is improved by the parallel decoding of multiple processing cores without being limited by the stream characteristics. Furthermore, since the entropy decoders and the CTU decoders process different frames, the idle time of the decoders is effectively reduced to improve the decoding efficiency.

Finally, it should be noted that the above embodiments are merely examples of the technical solutions of the disclosure, and are not intended to limit the disclosure. Although the disclosure has been described in detail with reference to the foregoing exemplary embodiments, those skilled in the art should understand that it is possible to modify the technical solutions described in the foregoing embodiments, or equivalently replace some or all of the technical features. These modifications or replacements do not cause the essence of the technical solutions to deviate from the scope of the technical solutions of the embodiments of the disclosure.

What is claimed is:

1. A video decoding method, comprising:
receiving an initial stream, wherein the initial stream comprises a stream of a plurality of first frames and a stream of a second frame;
in a first flow cycle, performing entropy decoding on the stream of the first frames in parallel by a plurality of entropy decoders of a plurality of processing cores to generate a plurality of first decoded streams respectively corresponding to the first frames; and
in the first flow cycle, decoding a second decoded stream by a plurality of coding tree unit decoders of the plurality of processing cores to reconstruct the second frame, wherein the second decoded stream is generated by performing entropy decoding on the stream of the second frame,
wherein the coding tree unit decoders comprise a first coding tree unit decoder and a second coding tree unit decoder, and in the first flow cycle, decoding the second decoded stream by the coding tree unit decoders of the processing cores to reconstruct the second frame comprises:
decoding coding tree units of an $i^{th}$ row of the second frame in the first flow cycle by the first coding tree unit decoder; and
decoding coding tree units of an $(i+1)^{th}$ row of the second frame in the first flow cycle by the second coding tree unit decoder.

2. The video decoding method according to claim 1, wherein the entropy decoders comprise a first entropy decoder and a second entropy decoder, and in the first flow cycle, performing entropy decoding on the first frames in parallel according to the initial stream by the entropy decoders of the processing cores to generate the first decoded streams respectively corresponding to the first frames comprises:
configuring a first buffer area and a second buffer area respectively corresponding to the first entropy decoder and the second entropy decoder; and
writing one of the first decoded streams to the first buffer area by the first entropy decoder, and writing another one of the first decoded streams to the second buffer area by the second entropy decoder.

3. The video decoding method according to claim 1, wherein decoding the coding tree units of the row of the second frame in the first flow cycle by the first coding tree unit decoder comprises:
when decoding the coding tree units of the $i^{th}$ row of the second frame, writing boundary reference information generated by decoding the coding tree units of the row to a boundary reference information buffer area of a memory by the first coding tree unit decoder.

4. The video decoding method according to claim 3, wherein decoding the coding tree units of the $(i+1)^{th}$ row of the second frame in the first flow cycle by the second coding tree unit decoder comprises:
reading the boundary reference information of the coding tree units of the row from the boundary reference information buffer area by the second coding tree unit decoder;
decoding the coding tree units of the $(i+1)^{th}$ row according to the boundary reference information by the second coding tree unit decoder; and
when decoding the coding tree units of the $(i+1)^{th}$ row of the second frame, writing boundary reference information generated by decoding the coding tree units of the $(i+1)^{th}$ row to the boundary reference information buffer area of the memory by the second coding tree unit decoder.

5. The video decoding method according to claim 3, wherein decoding the coding tree units of the $(i+1)^{th}$ row of the second frame in the first flow cycle by the second coding tree unit decoder comprises:
in response to the first coding tree unit decoder completing decoding of first X coding tree units of the $i^{th}$ row, activating the second coding tree unit decoder to start decoding the coding tree units of the $(i+1)^{th}$ row.

6. The video decoding method according to claim 1, further comprising:
a second flow cycle before the first flow cycle, performing entropy decoding of the second frame according to the initial stream by one of the entropy decoders to generate the second decoded stream corresponding to the second frame.

7. The video decoding method according to claim 1, further comprising:
determining the number of the processing cores that are activated according to a video format of the initial stream, wherein each of the processing cores comprises one of the entropy decoders and one of the coding tree unit decoders.

8. A video decoding device, comprising:
a memory recording an initial stream, wherein the initial stream comprises a stream of a plurality of first frames and a stream of a second frame;
a plurality of processing cores, wherein each of the processing cores comprises an entropy decoder and a coding tree unit decoder;
a plurality of the entropy decoders coupled to the memory; and
a plurality of the coding tree unit decoders coupled to the memory,
wherein in a first flow cycle, the entropy decoders perform entropy decoding on the stream of the first frames in parallel to generate a plurality of first decoded streams respectively corresponding to the first frames, and
in the first flow cycle, the coding tree unit decoders decode a second decoded stream to reconstruct the second frame, wherein the second decoded stream is generated by performing entropy decoding on the stream of the second frame,
wherein the coding tree unit decoders comprise a first coding tree unit decoder and a second coding tree unit decoder, and
the first coding tree unit decoder decodes coding tree units of an $i^{th}$ row of the second frame in the first flow cycle, and the second coding tree unit decoder decodes coding tree units of an $(i+1)^{th}$ row of the second frame in the first flow cycle.

9. The video decoding device according to claim 8, wherein the video decoding device further comprises a control circuit, the entropy decoders comprise a first entropy decoder and a second entropy decoder, and the control circuit configures a first buffer area and a second buffer area respectively corresponding to the first entropy decoder and the second entropy decoder, and
the first entropy decoder writes one of the first decoded streams to the first buffer area of the memory, and the second entropy decoder writes another one of the first decoded streams to the second buffer area of the memory.

10. The video decoding device according to claim 8, wherein when the first coding tree unit decoder decodes the coding tree units of the $i^{th}$ row of the second frame, the first coding tree unit decoder writes boundary reference information generated by decoding the coding tree units of the row to a boundary reference information buffer area of the memory.

11. The video decoding device according to claim 10, wherein the second coding tree unit decoder reads the boundary reference information of the coding tree units of the $i^{th}$ row from the boundary reference information buffer area, and decodes the coding tree units of the $(i+1)^{th}$ row according to the boundary reference information, and
when the second coding tree unit decoder decodes the coding tree units of the $(i+1)^{th}$ row of the second frame, the second coding tree unit decoder writes boundary reference information generated by decoding the coding tree units of the $(i+1)^{th}$ row to the boundary reference information buffer area of the memory.

12. The video decoding device according to claim 10, wherein the video decoding device further comprises a control circuit, which in response to the first coding tree unit decoder completing decoding of first X coding tree units of the row, activates the second coding tree unit decoder to start decoding the coding tree units of the $(i+1)^{th}$ row.

13. The video decoding device according to claim 8, wherein in a second flow cycle before the first flow cycle, one of the entropy decoders performs entropy decoding of the second frame according to the initial stream to generate the second decoded stream corresponding to the second frame.

14. The video decoding device according to claim 8, further comprising a control circuit, wherein the control circuit determines the number of the processing cores that are activated according to a video format of the initial stream.

15. A video decoding device, comprising:
a memory recording an initial stream, wherein the initial stream comprises a stream of a plurality of first frames and a stream of a second frame;
a plurality of processing cores, wherein each of the processing cores comprises an entropy decoder and a coding tree unit decoder;
a plurality of the entropy decoders coupled to the memory; and
a plurality of the coding tree unit decoders coupled to the memory,
wherein in a first flow cycle, the entropy decoders perform entropy decoding on the stream of the first frames in parallel to generate a plurality of first decoded streams respectively corresponding to the first frames, and in the first flow cycle, the coding tree unit decoders decode a second decoded stream to reconstruct the second frame, wherein the second decoded stream is generated by performing entropy decoding on the stream of the second frame, wherein in a second flow cycle before the first flow cycle, one of the entropy decoders performs entropy decoding of the second frame according to the initial stream to generate the second decoded stream corresponding to the second frame.

* * * * *